United States Patent [19]

Mausolf et al.

[11] 4,057,139

[45] Nov. 8, 1977

[54] REVERSIBLE ARRANGEMENT FOR TRANSPORTING BULK MATERIALS

[75] Inventors: Georg Mausolf, Klein Dohren; Herbert Bellenbaum; Josef Dietrich, both of Salzgitter, all of Germany

[73] Assignee: Salzgitter Maschinen AG, Salzgitter, Germany

[21] Appl. No.: 691,412

[22] Filed: June 1, 1976

[30] Foreign Application Priority Data

May 31, 1976 Germany .............................. 2524212

[51] Int. Cl.$^2$ .................................................. B65G 29/00
[52] U.S. Cl. .................................... 198/509; 198/706; 198/577; 37/189
[58] Field of Search ............... 198/307, 701, 706, 509, 198/577; 37/91, 92, 93, 94, 95, 96, 97, 189, 190, 191, 192; 214/10

[56] References Cited

U.S. PATENT DOCUMENTS

| 1,455,206 | 5/1923 | Howe et al. | 37/97 |
|---|---|---|---|
| 1,550,891 | 8/1925 | Eck | 198/701 X |
| 1,954,278 | 4/1934 | Adams | 198/466 |
| 1,974,190 | 9/1934 | Miller | 37/190 W |
| 2,109,139 | 2/1938 | Pardee, Jr. | 198/701 X |
| 2,724,482 | 11/1955 | DeFrancisci | 198/466 |
| 3,081,863 | 3/1963 | Monohan | 198/466 |
| 3,412,491 | 11/1968 | Raabe et al. | 37/189 |
| 3,557,880 | 1/1971 | van der Lely et al. | 37/94 |
| 3,595,371 | 7/1971 | Smith | 198/307 |
| 4,009,531 | 3/1977 | Metrier | 34/94 |

FOREIGN PATENT DOCUMENTS

| 1,036,178 | 8/1958 | Germany | 37/189 B |
|---|---|---|---|
| 603,729 | 9/1934 | Germany | 37/191 R |
| 170,369 | 2/1952 | Germany | 37/190 |

Primary Examiner—Evon C. Blunk
Assistant Examiner—Richard K. Thomson
Attorney, Agent, or Firm—Michael J. Striker

[57] ABSTRACT

A reversible arrangement for transporting bulk materials includes a plurality of buckets mounted on a bucket wheel for rotation therewith and for pivoting between respective end positions in which the open ends of the buckets face in respective circumferential directions of the bucket wheel. The buckets are mounted on levers which are interconnected by flexible elements for coordinated displacement of the buckets between the end positions. The bucket wheel carries two circumferentially and radially spaced cams which control the extent of displacement of cam followers of respective switches between their respective retracted and extended positions. A detaining arrangement is situated along the path of movement of the buckets and engages one of the buckets during the reverse motion of the bucket wheel to detain the bucket while the bucket wheel continues to rotate so that the buckets are angularly displaced between their end positions. One of the above-mentioned switches controls the detaining arrangement, while the other switch prevents actuation of the one switch when both of the cam followers are aligned with their associated cams. The arrangement includes further switches arranged in a control circuit with the aforementioned switches and accomplishing therewith an automatic reversal of the operation of the arrangement.

20 Claims, 10 Drawing Figures

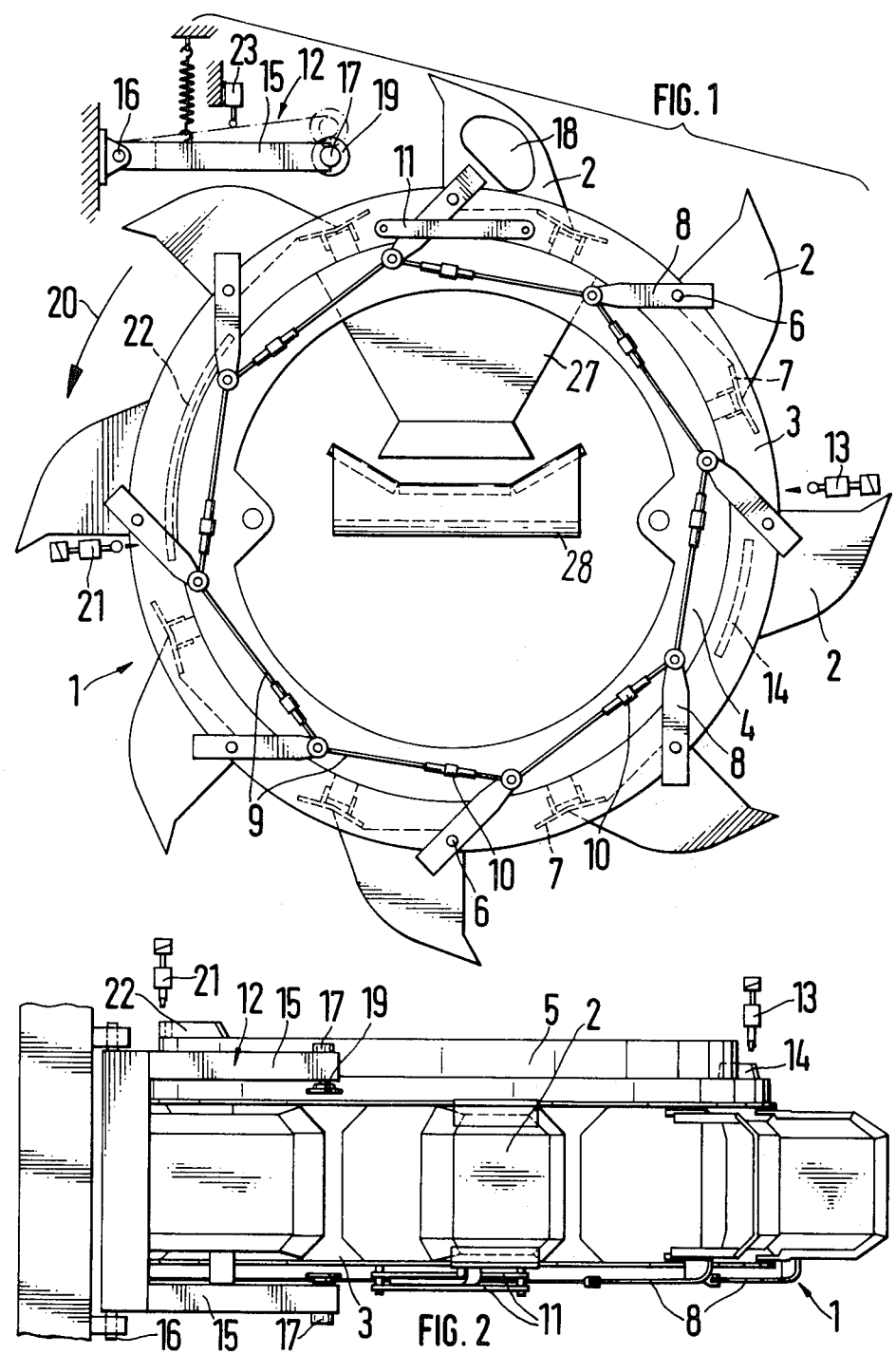

REVERSIBLE ARRANGEMENT FOR TRANSPORTING BULK MATERIALS

BACKGROUND OF THE INVENTION

The present invention relates to an arrangement for transporting bulk materials, and more particularly to a reversible bulk conveyor arrangement.

There are already known various conveying arrangements of the type here under consideration which, generally speaking, are used for conveying loose particulate or bulk material from one location to another. Such arrangements usually have a plurality of buckets mounted on a bucket wheel which rotates about a horizontal axis while the machine on which the bucket wheel is mounted advances so that the bulk material seriatim enters the buckets through their open ends and is subsequently discharged therefrom at a distant location. Some of these conventional conveying arrangements are reversible which means that not only the rotation of the bucket wheel can be reversed, but also the buckets which are mounted on the bucket wheel must be displaceable between different end positions in each of which the open end of the bucket faces in a different circumferential direction of the bucket wheel. It will be appreciated that, when the conveying arrangement is of the reversible type, the bulk material can be transported by the buckets regardless of the direction of advancement of the machine which carries the bucket wheel.

Such reversible bucket conveying arrangements can be, for instance, used for turning over a heap of bulk material, such as coal or ores in which layers of different particle magnitudes have been formed during the original formation of the heap. As a result of the fact that the bucket wheel rotates about a horizontal axis, it simultaneously removes the bulk material of different particle magnitudes from the various horizontal layers of the heap, which improves the homogeneity of the heap of the particulate material which is formed downstream of the bucket conveying arrangement. The original lack of homogeneity, and the existence of the layers of different particle magnitudes, result from the fact that the material which is to be deposited in horizontal layers to form the heap passes through a comminuting device prior to being deposited, which comminuting device comminutes the material to particles of different magnitudes or sizes depending on the hardness and coherence of the larger particles to be comminuted. The present invention is concerned with a bucket conveying arrangement of this type, but it will be appreciated that the concepts of the present invention can also be used in conveying arrangements of different types.

As already mentioned above, in order to improve the efficiency of the conveying arrangement by operating the transporting arrangement not only during the forward advancement of the device on which the bucket wheel is mounted, but also during the rearward advancement, it is already known to reverse the rotation of the bucket wheel and to angularly displace the buckets so that the open ends of the buckets face in an opposite circumferential direction of rotation of the bucket wheel. For this purpose, it is already known to mount the buckets on the bucket wheel for pivoting between their end positions about pivot axes parallel to the axis of rotation of the bucket wheel. This operation is usually performed manually, one bucket after the other. This involves a laborious, expensive, and even dangerous operation which includes serial release of arresting means which holds the respective bucket in one of the end positions, tilting of the bucket about the pivot axis, and rearresting the bucket in its other end position. The conventional arresting means used for arresting the buckets in their end positions includes screws, wedges and similar arresting means. Thus, it will be seen that the serial tilting of the buckets is very time-consuming, requires exertion of substantial forces, particularly when the buckets are heavy, and the need for the presence of the operating personnel in the vicinity of the bucket wheel involves a certain amount of danger.

SUMMARY OF THE INVENTION

Accordingly, it is a general object of the present invention to avoid the disadvantages of the prior art.

More particularly, it is an object of the present invention to provide a reversible bucket conveying arrangement which can be easily reversed in a minimum of time. A further object of the present invention is to provide a reversible arrangement for conveying bulk materials which is simple in construction and reliable in operation.

A concomitant object of the present invention is to provide an arrangement of the type here under consideration which can be performed automatically and thus eliminates the need for presence of the operating personnel in the vicinity of the bucket wheel.

In pursuance of these objects and others which will become apparent hereafter, one feature of the present invention resides, briefly stated, in an arrangement for transporting bulk materials, in a combination comprising a support; transporting means mounted on the support for rotation in opposite circumferential directions about a central axis and including a bucket wheel, at least one bucket having an open end, and means for mounting the bucket on the bucket wheel for angular displacement relative thereto along a plane transverse to the central axis between two end positions in each of which the open end of the bucket faces in one of the circumferential directions, and for shared movement therewith in a circular path; means for rotating the transporting means in a transporting mode in which the bulk material enters the bucket through the open end which faces in the circumferential direction of movement of the bucket; means for operating the transporting means in a reversing mode in which the bucket moves in an opposite circumferential direction than during the transporting mode; and means for angularly displacing the bucket during the reversing mode, including detaining means arranged at a predetermined location along the path and operative for engaging the bucket, and means for actuating the detaining means into engagement with the bucket at the above-mentioned location to thereby discontinue the movement of the bucket in the path and angularly displace the same relative to the bucket wheel from one into the other end position during the continuing rotation of the bucket wheel in the opposite direction.

In a currently preferred embodiment of the present invention, the transporting means includes a plurality of additional buckets which are similar to the bucket and angularly distributed on the bucket wheel about the central axis thereof, the buckets being interconnected with one another for synchronized angular displacement between the respective two end positions thereof. Preferably, the mounting means includes a pivot which mounts the bucket on the bucket wheel for pivoting between the above-mentioned end positions about a pivot axis which is radially spaced from and substantially parallel to the central axis of the bucket wheel.

According to a further concept of the present invention, the displacing means includes means for detecting the position of the bucket in the path and operative for generating a signal when the bucket is at the above-mentioned location during the reversing mode, the actuating means being responsive to the signal. Advantageously, the detecting means includes a part-annular cam coaxially mounted on the transporting means for shared rotation therewith and extending over an angle corresponding to that through which the transporting means is to rotate during the actuation of the retaining means, a cam follower mounted on the support for displacement toward and away from the path of movement of the cam, means for displacing the cam follower between a retracted position in which the cam follower is spaced from the path of movement of the cam, an intermediate position in which the cam follower contacts the cam, and an extended position in which the cam follower extends into the path of movement of the cam beyond the limits of the latter, and means for generating the signal mounted on the cam follower for shared displacement therewith and generating the above-mentioned signal in the extended position of the cam follower. The signal generating means may include a switch which is open in the retracted and intermediate positions, and closed in the extended position of the cam follower and which controls the actuating means of the detaining means.

As may be seen from the above description of the structure and operation of the various components of the arrangement, the angular displacement of the buckets about their pivot axes is achieved in such a way that, as the bucket wheel is operated in a reverse mode, the detaining means engages the respective bucket and detains the same, and the continuing movement of the bucket wheel in the reverse mode results in angular displacement of the buckets about their axes between their end positions. A particular advantage of this arrangement is to be seen in the fact that the reversal of motion of the bucket wheel, as well as the angular displacement of the buckets between their end positions, can be initiated and controlled from a central control station which is remote from the bucket wheel and the associated components, the entire reversing and angularly displacing operation being accomplished fully automatically without the need for the operating personnel to be present in the vicinity of the bucket wheel. A further advantage obtained by the arrangement of the present invention is that the time period needed for reversing and angularly displacing the bucket wheel and the buckets is extremely short, particularly in view of the fact that all of the buckets are angularly displaced between their end positions at the same time.

According to a further concept of the present invention, the detecting means further includes an additional cam circumferentially and radially spaced from the above-mentioned cam and extending over a larger angle than the latter, an additional cam follower similar to the above-mentioned cam follower, and additional signal generating means which is operative for generating the control signal which releases the above-mentioned cam follower for displacement toward the extended position when the additional cam follower extends into the path of displacement of the additional cam beyond the limits of the latter. The additional cam can be substantially diametrally opposite to the above-mentioned cam and the additional cam follower can be arranged substantially diametrally opposite to the above-mentioned cam follower. The detecting means may further include additional means for displacing the additional cam follower between its respective retracted, intermediate and extended positions and operative for displacing the additional cam follower toward its retracted position immediately upon reaching the extended position, and the additional signal-generating means may include an additional switch which is open in the intermediate and extended positions and closed in the retracted position and which controls the displacement of the above-mentioned cam follower.

It may be seen from what has been discussed immediately above that the additional cam and cam follower cooperate with one another in such a manner as to prevent actuation of the detaining means when the first-mentioned cam is aligned with the first-mentioned cam follower in the initial position assumed by the bucket wheel upon termination of its transporting mode. On the other hand, if the bucket wheel stops in a position in which the second-mentioned cam follower is free to move into its extended position, the latter will immediately return into its retracted position and thus energize the first-mentioned cam follower for displacement toward its intermediate or extended position, depending on the position of the first-mentioned cam relative to the first-mentioned cam follower. This expedient eliminates the danger of improper engagement of the bucket by the detaining means in a situation where the bucket wheel stops with the respective bucket close to but spaced from the proper engaging location.

A further expedient proposed by the present invention which eliminates the possibility that the engaging forces between the detaining means and the bucket could act on the shaft and bearings on which the bucket wheel is mounted for rotation is to construct the detaining means with a pair of detaining portions which are arranged at the above-mentioned location to axial sides of the above-mentioned path, the actuating means being operative for simultaneously displacing the detaining portions toward and away from the path and into and out of engagement with the bucket in a direction transverse to the above-mentioned path and substantially parallel to the central axis.

According to a currently preferred embodiment of the present invention the detaining means includes at least one arm which has a first end pivotally mounted on the support, and a free second end at the above-mentioned detaining location, the detaining portions being mounted on the second end of the arm for shared pivoting therewith. The detaining means may include two detaining units each of which has a stationary element and a movable element, the detaining portions being formed on or connected to the movable element. The units may be hydraulic or pneumatic cylinder-and-piston units, or electromagnetic units or may include at least one electromotor which displaces the movable elements relative to the stationary elements.

In this embodiment of the present invention, the fact that the detaining units are mounted on the arm for pivoting about an axis parallel to the central axis of the bucket wheel results in a situation where the detaining units can move in arcuate paths toward and away from the central axis of the bucket wheel during the angular displacement of the respective bucket so that no clamping forces will be transmitted from the detaining units to the bucket wheel or vice versa during the angular displacement of the respective bucket, regardless of the fact that the locations at which the respective bucket is engaged by the detaining portions of the detaining units conduct part-circular movements about the respective pivot axis, which results in an initial increase and a subsequent decrease of the distance of such locations from the central axis of the bucket wheel. In other words, the pivotal mounting of the arm allows for compensation for such increase and decrease in the spacing of the particular locations from the central axis of the bucket wheel.

The mounting means of the present invention preferably includes a lever which has one end attached to the bucket, another end spaced from the one end, and a mounting portion which is intermediate the ends and which is mounted on the pivot, the interconnecting means connecting the other ends of the levers of the mounting means of the one and additional buckets with one another. The interconnecting means may include a plurality of elongated connecting elements which are connected to each adjacent two of the above-mentioned levers, the connecting elements compensating for differential displacement of the levers relative to one another during the angular displacement of the buckets. The connecting elements may be, to advantage, ropes. In a further currently preferred embodiment of the present invention, the arrangement further comprises means for arresting the bucket in one of the positions thereof, the arresting means including brake means which engages the respective lever at least in the end positions of the bucket and prevents undesirable angular displacement of the lever and of the bucket, particularly during the transporting mode of operation of the arrangement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a side elevational view of the arrangement for transporting bulk materials of the present invention;

FIG. 2 is a top plan view of the arrangement of FIG. 1;

DETAILED DISCUSSION OF THE PREFERRED EMBODIMENTS

Figure 3:
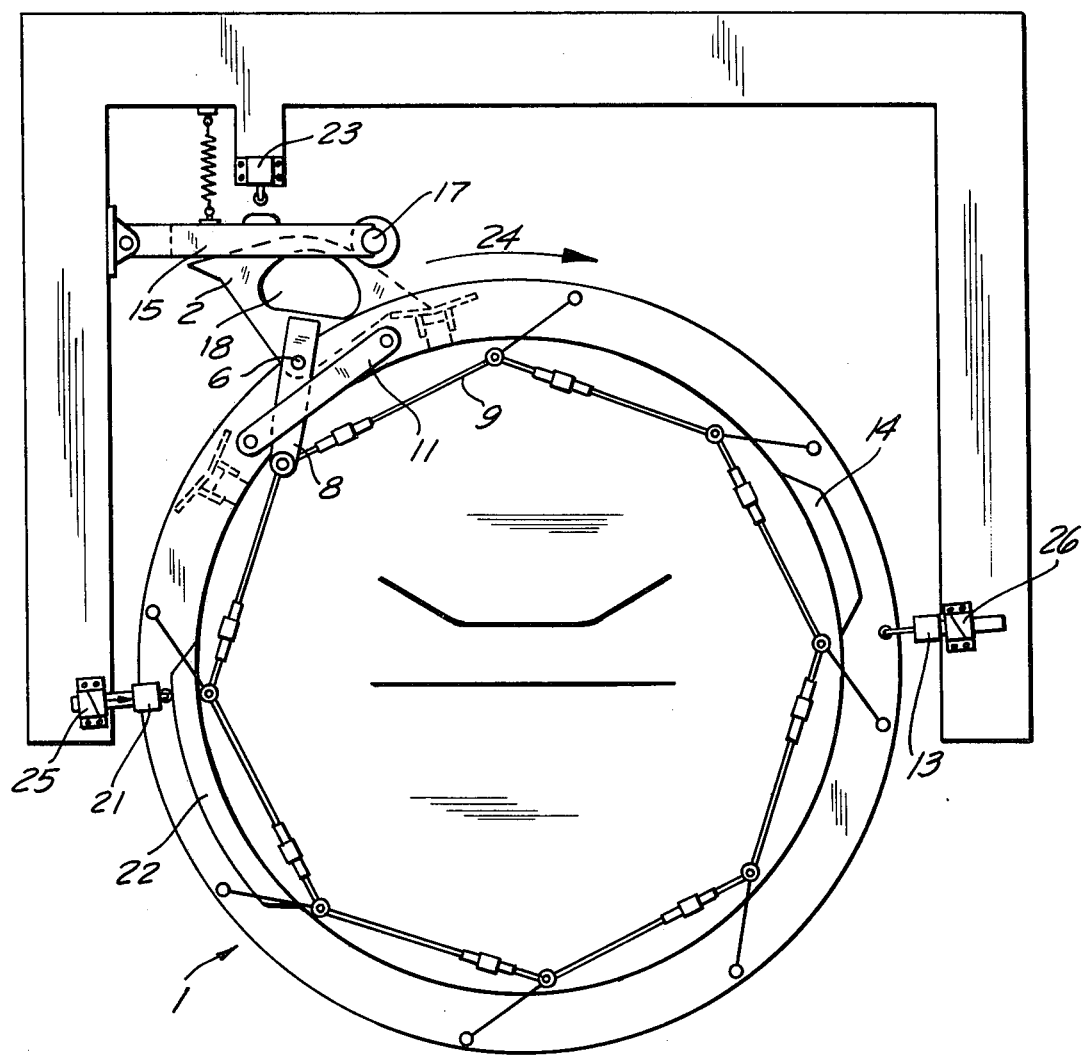
FIGS. 3 to 8 are somewhat diagrammatic side elevational views similar to FIG. 1 in various positions of the transporting arrangement.

Referring now to the drawings, and first to FIGS. 1 and 2 thereof, it may be seen that the reference numeral 1 designates a bucket wheel which includes a rotatable ring 3 on which a plurality of buckets 2 is mounted for shared rotation therewith, and a rigid annular support 4 for the rotatable ring 3. A conventional transmission arrangement 5 is interposed between the support 4 and the ring 3 at one axial side of the bucket wheel 1.

The buckets 2 are mounted on the ring 3 by means of respective pivots 6 which permit angular displacement of the buckets 2 relative to the ring 3 along a plane which is substantially normal to the central axis of the ring 3. The ring 3 is also equipped with abutment plates 7 which extend approximately in planes which are tangential to the ring 3 and which limit the extent of pivoting displacement of the buckets 2 about their pivots 6. The bucket 2 has respective open ends, one of which is at least partially closed by the respective abutment plate 7 in each of the angularly displaced end positions of the buckets 2.

A lever 8 is associated with each of the buckets 2, being rigidly connected thereto at an axial side of the bucket wheel 1 which is opposite to the component 5. The lever 8 has a mounting portion which is supported on the pivot 6, and a free end which is located to the other side of the pivot 6 from the bucket 2. The lever 8 extends parallel to the axis of symmetry of the respective bucket 2.

Connecting ropes 9 interconnect the free ends of the levers 8, which ropes serve the purpose of transmitting the angular displacement of one of the levers 8 to the other levers 8 so as to angularly displace all of the buckets 2 at the same time. Tensioning devices 10 are mounted on each of the ropes 9, which serve the purpose of tensioning the ropes 9 to such an extent that the ropes 9 are taut in the illustrated end positions of the buckets 2, but are slackened during the movement of the levers 8 between the end positions.

A pair of brake shoes 11 is rigidly connected to the ring 3, one of the levers 8 being received between the brake shoes 11. The brake shoes 11 retard the movement of the lever 8 which is received between them and, due to the interconnection of the levers 8 with one another by the ropes 9, the angular movement of all of the levers 8 and all of the buckets 2 is thus retarded. The brake shoes 11 are preferably so adjusted that the frictional retardation moment exerted by the brake shoes 11 on the lever 8 is somewhat greater than the tilting moment attributable to the weight of the buckets 2.

As already mentioned above, the buckets 2 can be angularly displaced between their respective end positions. This angular displacement is accomplished by means of a detaining arrangement which has been designated in toto with the reference numeral 12. The detaining arrangement 12 includes at least one but preferably two arms 15 which are mounted for pivoting about a common stationary pivot 16 along a plane normal to the axis of rotation of the bucket wheel 1. Each of the arms 15 is arranged axially adjacent to one side of the path of movement of the buckets about a central axis of the bucket wheel 1, and detaining units 17 of conventional construction, such as cylinder-and-piston units, electromagnetic units or electromotor-driven units, are supported at the free ends of the arms 15. Detaining portions 19 are mounted at the movable elements of the above-mentioned detaining units for reciprocation therewith toward and away from the path of movement of the buckets 2 and into and out of contact with respective contact surfaces 18 of a respective bucket 2.

The detaining portions 19 are brought into contact with the surfaces 18 when it is desired to angularly displace the buckets 2 about the pivots 6, as will be discussed in more detail later on. However, it is to be mentioned at this point that regions of engagement of the detaining portions 19 with the surfaces 18 conduct part-circular movements about the pivots 6 during the angular displacement of the buckets 2 so that the distance of such regions from the central axis of rotation of the bucket wheel 1 first increases then decreases during the angular displacement of the buckets 2, so that the arms 15 are pivoted between the solid-line positions and the broken-line positions thereof as illustrated in FIG. 1. A time-delay switch 23 is stationarily mounted on the support for the bucket wheel 1, the switch 23 having an actuating portion which extends in the path of pivoting of the arms 15 between their illustrated positions, the switch 23 being actuated upon contact of the actuating portion thereof with the arm 15 in the broken-line position of the latter. The function and operation of the time-delay switch 23 will be discussed later.

The actuation of the detaining units 17 is to be coordinated with the position of the bucket wheel 1 relative to the detaining arrangement 12. In other words, the detaining units 17 must be actuated at the precise moment when the detaining portions 19 face the surfaces 18. Thus, in order to be able to coordinate the reversal of the transporting arrangement of the present invention, it is necessary to detect the position of the respective bucket 2 relative to the detaining arrangement 12. The above-mentioned coordination is achieved by means of a switch 13 which cooperates with a cam 14, the latter being mounted on the ring 3 for rotation therewith. The switch 13 is located at such an angular distance from the detaining units 17 that the surfaces 18 of the respective bucket 2 are in alignment with the detaining portions 19 when the leading end of the cam 14 as considered in the direction of rotation of the bucket wheel 1 is aligned with the cam follower of the switch 13.

The switch 13 is incorporated in a step-by-step control circuit which will be discussed later, the circuit further including another switch 21 which is also stationarily arranged next to the bucket wheel 1. The switches 13 and 21 are in reality positioned as illustrated in FIG. 2, that is, in parallelism with the central axis of the bucket wheel 1 but have been rotated through 90° into the plane of drawing in FIG. 1 in order to facilitate the understanding of the invention.

The switch 21 cooperates with an additional cam 22 which is radially and circumferentially spaced from the cam 14. In the illustrated embodiment, the cam 22 is arranged diametrally opposite to the cam 14. The circumferential length of the cam 22 is greater than the circumferential length of the cam 14 for reasons which will be explained later.

FIGS. 3 to 8 illustrate, in a diagrammatic manner, the bucket wheel and one of the buckets 2 during various phases of reversal of the transporting arrangement. The operation of the transporting arrangement of the present invention during reversal thereof will now be explained on hand of FIGS. 1 and 3 to 8.

When the transporting arrangement operates in a transporting mode, which is illustrated in FIG. 1 by an arrow 20, the bulk material to be transported enters the buckets 2 through their open ends which face in the direction of the arrow 20, is transported by the buckets 2 and eventually discharged therefrom in a conventional manner, for instance, into a hopper 27 and through the same onto a conveyor 28 which are of conventional constructions and thus have not been illustrated in detail. When the transporting mode of operation of the bucket wheel 1 is terminated preparatory to the reversal of the transporting arrangement, the bucket wheel can assume any of the positions illustrated in FIGS. 1 and 3 to 6. More likely than not, the respective bucket 2 which has the surfaces 18 will be angularly spaced from the detaining units 17. Upon such termination, a signal issuing from a control stand starts operation of the bucket wheel 1 at a slow speed in direction of an arrow 24, that is opposite to the direction 20. Simultaneous with commencement of rotation of the bucket wheel in the direction of the arrow 24, an electromagnetic actuating unit 25 is energized, and the cam follower of the switch 21 is thus moved toward the path of movement of the cam 22. The function of the switch 21, as already mentioned above, is to control the operation of the switch 13.

When the bucket wheel 1 is in the position illustrated in FIG. 3, that is, when the cam follower of the switch 21 encounters the cam 22 during its displacement, the switch 21 prevents energization of an electromagnetic unit 26 which controls the displacement of the switch 13 and the cam follower thereof. In this position of the bucket wheel 1, the cam follower of the switch 13 is opposite to or closely next to the cam 14. Under these circumstances, the respective bucket 2 is within the region of the detaining units 17, but the latter are out of alignment with the surfaces 18. Under these circumstances, actuation of the detaining units 17 is to be prevented. This is the function which other switch 21 performs in cooperation with the cam 22.

Figure 4:
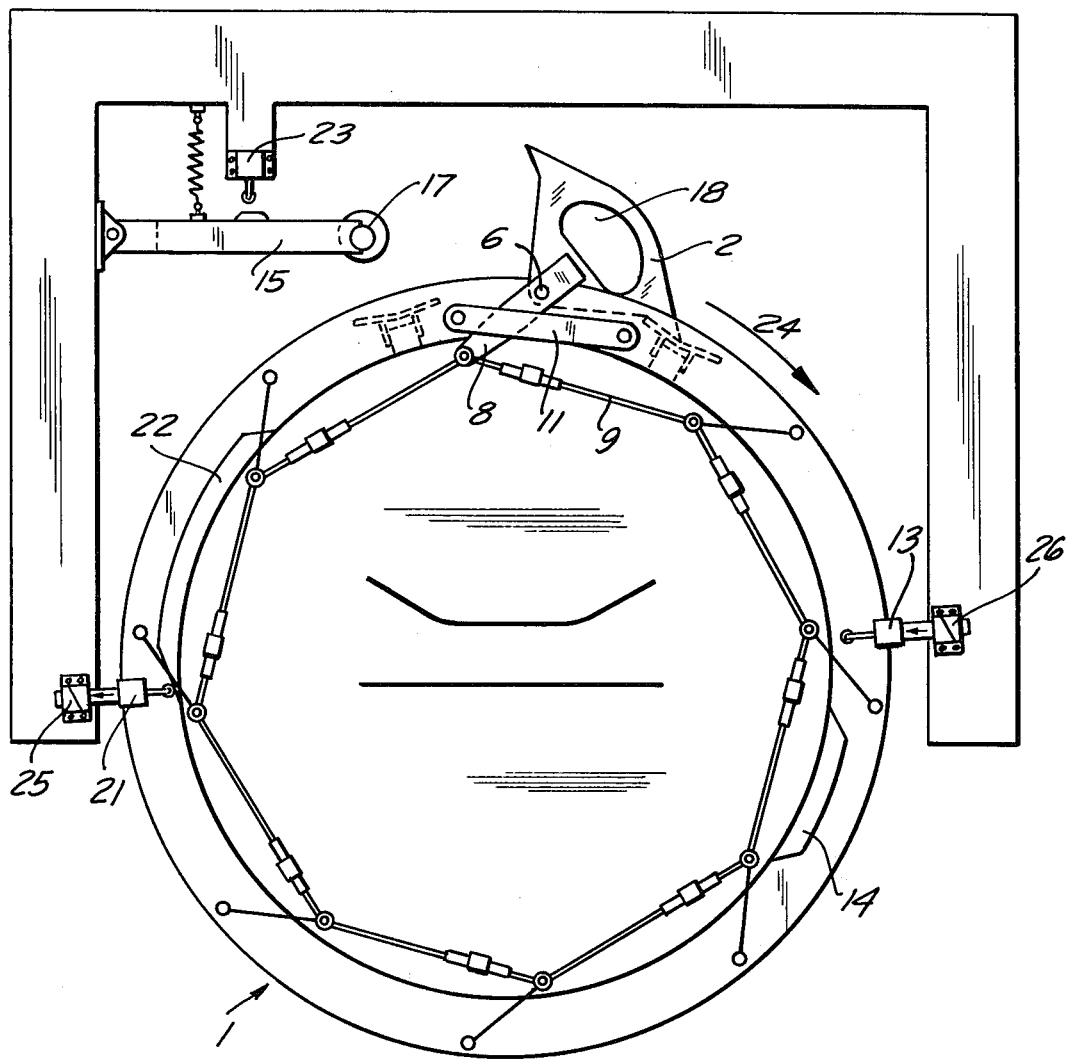

When the bucket wheel 1 accidentally stops in the position illustrated in FIG. 4, or is rotated into such position in the direction of the arrow 24 subsequent to the above-mentioned situation, the cam follower of the switch 21 is free to conduct its full stroke. When this happens, the cam follower of the switch 21 immediately returns into its original position in a manner yet to be described, and the switch 21 energizes the electromagnet 26 of the switch 13. Under these circumstances, however, the cam 14 is outside of the region of displacement of the cam follower of the switch 13, so that the cam follower of the switch 13 is free to conduct its full stroke toward its extended position. The cam follower of the switch 13 remains in this position while the bucket wheel 1 rotates in the direction of the arrow 24 through the position illustrated in FIG. 5 toward the position illustrated in FIG. 6.

Figure 5:
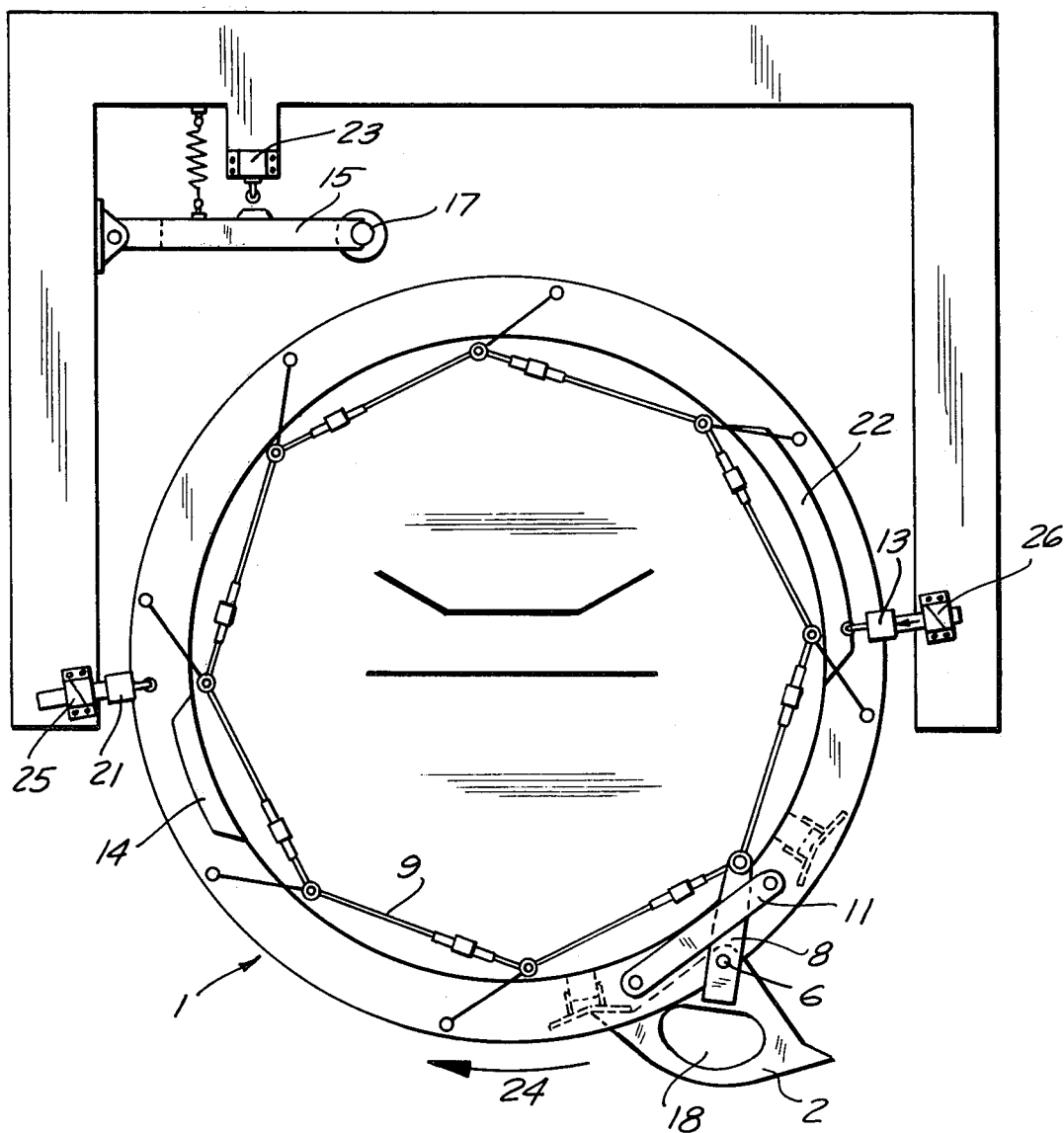

If the bucket wheel 1 has stopped, upon termination of the transporting mode, in the position illustrated in FIG. 5, similar considerations are valid. In other words, the cam follower of the switch 21 is free to conduct its full stroke and to return into its original position, thus energizing the electromagnet 26 and the cam follower of the switch 13 is displaced into its extended position.

Figure 6:
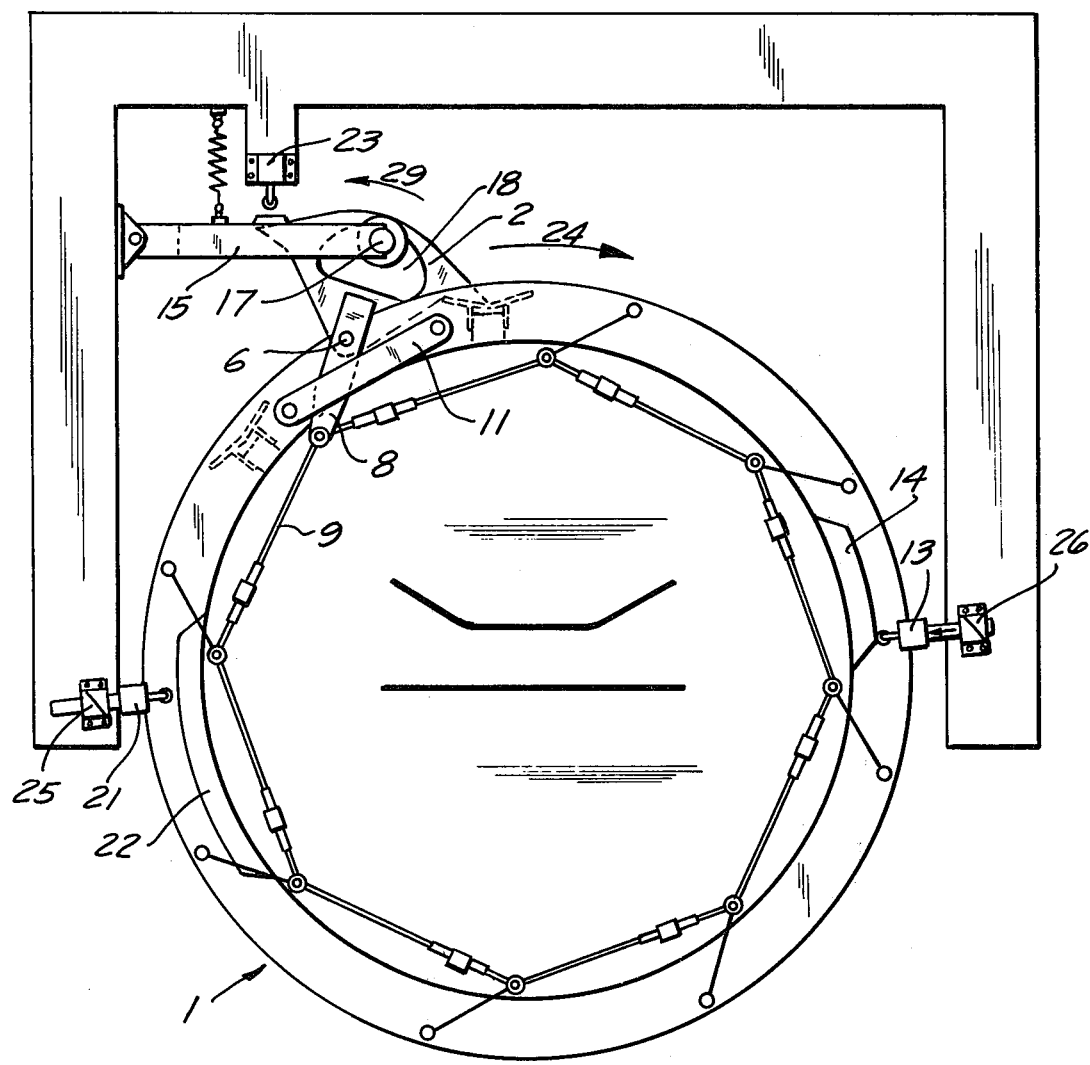
Figure 7:
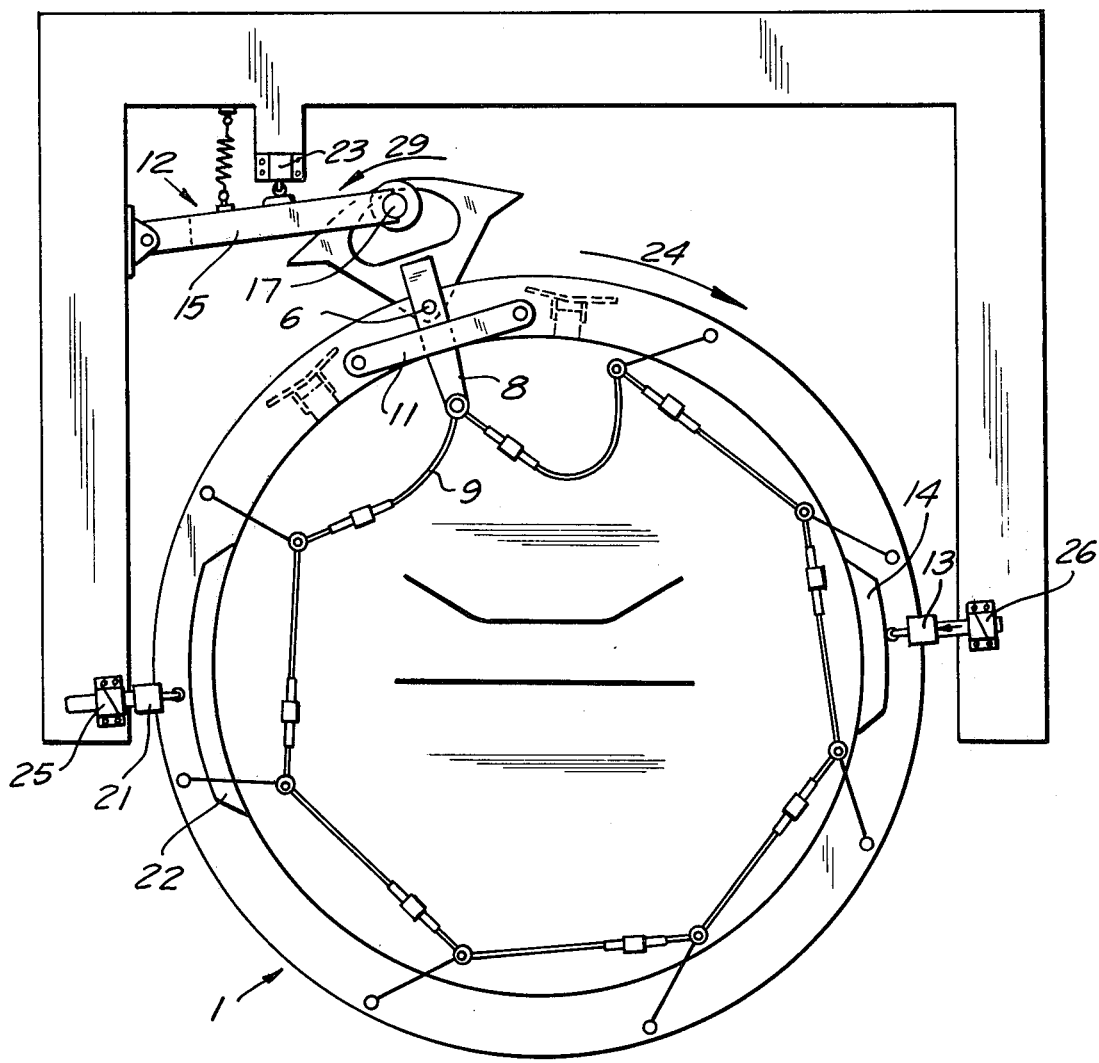

The bucket wheel 1 continues its rotation in the direction of the arrow 24 until it reaches its position illustrated in FIG. 6. As seen therein, the detaining units 17 are aligned with the surfaces 18 in this position of the bucket wheel 1. At this point, the cam 14 displaces the cam follower of the switch 13 into its intermediate position in which the switch 13 actuates the detaining units 17 in the sense of engagement of the detaining portions 19 with the surfaces 18. Further rotation of the bucket wheel 1 in the direction of the arrow 24 results in relative angular displacement of the respective bucket 2 in the direction of an arrow 29 with respect to the bucket wheel 1. During this angular displacement of the respective bucket 2, the arms 15 move into the position illustrated in FIG. 7, whereby the time-delay switch 23 is actuated.

Figure 8:
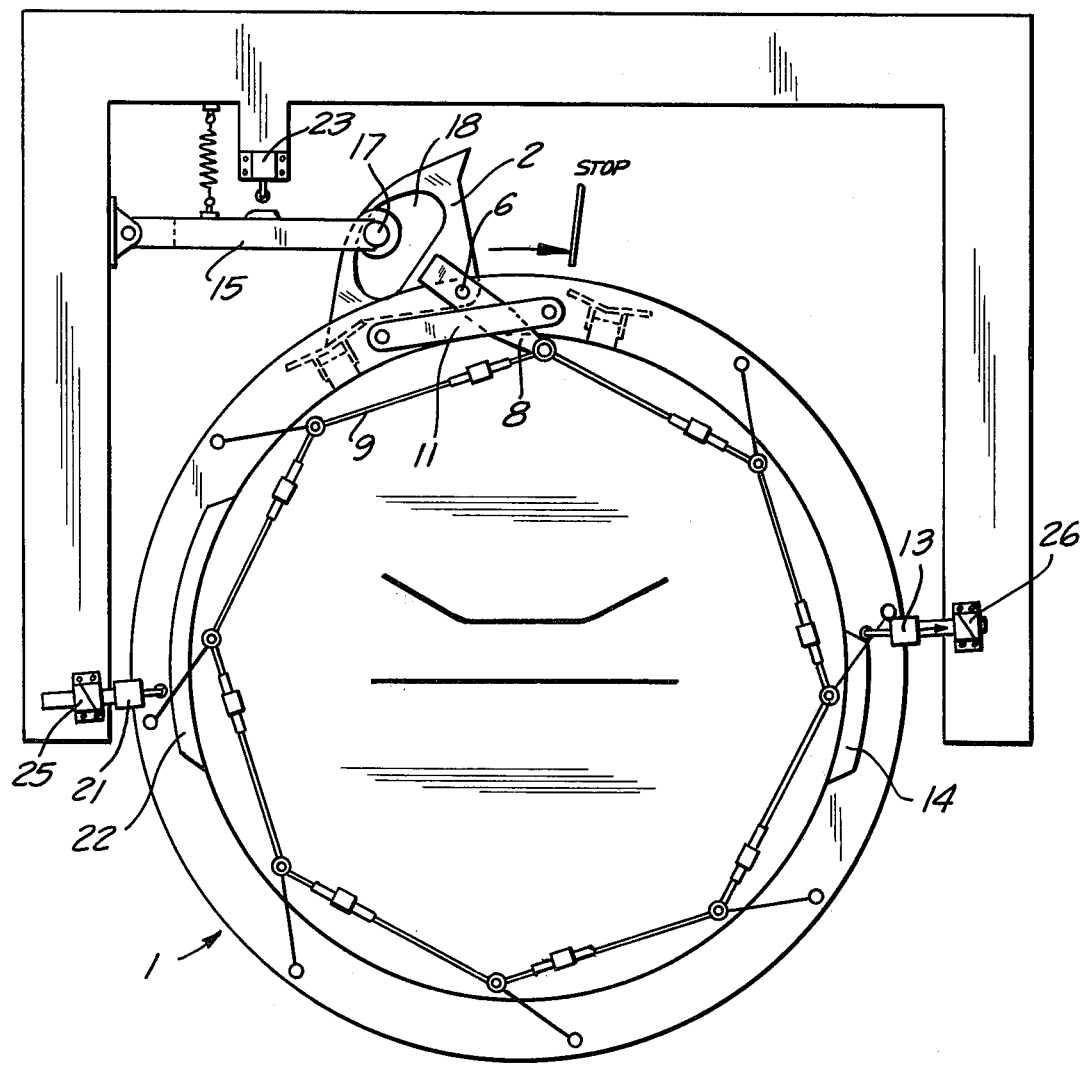

The angular displacement of the respective bucket 2 is continued until the position of the bucket wheel 1 illustrated in FIG. 8 is obtained. In this position, the cam follower of the switch 13 moves into its extended position again, following the slope of the trailing end of the cam 14, whereby the switch 13 deenergizes the detaining units 17 so that the latter are retracted from the surfaces 18 so that the bucket 2 which is in its reversed end position, together with the other buckets 2, is free to continue its shared rotation with the bucket wheel 1.

At this moment or shortly afterwards, the time-delay switch 23 retracts the cam follower of the switch 13 into its original retracted position and also discontinues the movement of the bucket wheel 1 in the direction of the arrow 24. Subsequently thereto, the transporting arrangement can be operated in a transporting mode with the buckets 2 facing oppositely to the buckets of FIG. 1, and in a direction opposite to the direction of the arrow 20 in FIG. 1.

Figure 9:
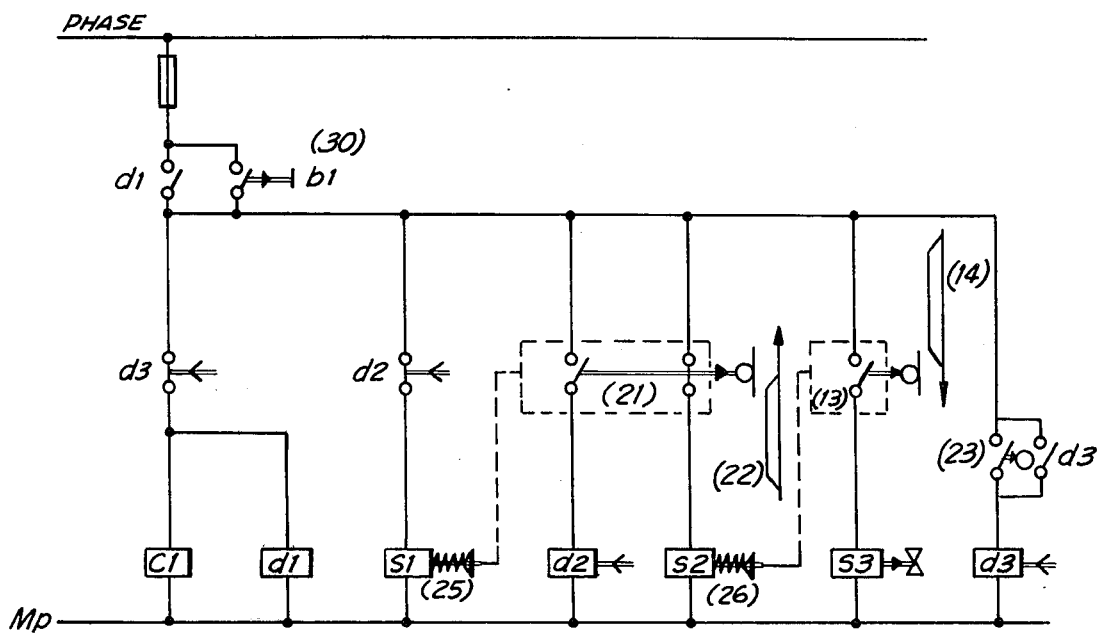
FIGS. 9 and 10 are partial schematic views of an arrangement for controlling the operation of the arrangement of FIG. 1.
Figure 10:
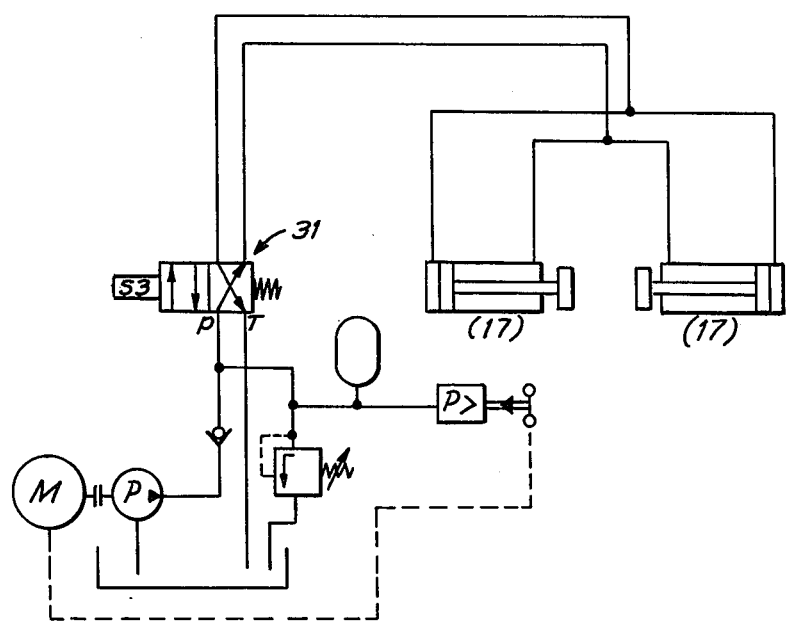

FIG. 9 illustrates an electric circuit which encompasses the above-mentioned switches, while FIG. 10 illustrates a hydraulic circuit which controls the operation of the detaining units 17. The operation of the corresponding arrangement will now be again explained with respect to the reversing mode with reference to FIGS. 9 and 10 taken together.

The electric circuit of FIG. 9 is arranged between a live wire designated as phase, and a grounding wire indicated by a reference character Mp. A switch 30 which controls the reversing mode of operation of the bucket wheel 1 is located at the control stand, the switch 30 including a normally open pushbutton-type switch element $b_1$. When the element $b_1$ is depressed, electric current flows through it and energizes an actuating part of a switch element $d_1$ so that the connecting part of the switch $d_1$ closes, whereby the supply of the electric current to the circuit is maintained even after release of the pushbutton switch element $b_1$. Upon depression of the switch element $b_1$, electric circuit flows through the connecting part of a switch $d_2$ and energizes an electromagnet $s_1$ of the switch 25. The electromagnet $s_1$ displaces the cam follower and the associated switch elements of the switch 21 toward their extended position, which they are able to reach if the displacement of the cam follower of the switch 21 is not obstructed by the cam 22. Upon displacement of the cam follower of the switch 21, supply of electric current to an electromagnet $s_2$ of the actuating unit 26 is interrupted so that the switch 13 and the cam follower thereof remain in their retracted position until the cam 22 releases the cam follower of the switch 21 for movement toward its extended position. When this happens, a relay $d_2$ is energized, the connecting portion thereof interrupts supply of current to the electromagnet $s_1$ and the cam follower of the switch 21 immediately returns into its retracted position illustrated in FIG. 1 so that electric current is supplied to the electromagnet $s_2$ of the unit 26, and the cam follower of the switch 13 is displaced toward its extended position in which it remains until the cam 14 displaces the cam follower of the switch 13 into its intermediate position in which the switch 13 establishes electric current flow to an electromagnet $s_3$ which, as illustrated in FIG. 10, controls a four-port two-position valve 31 interposed in a conventional hydraulic circuit between a pump P and the cylinders of the hydraulic detaining units 17. Preferably, the relay $d_2$ is of the time-delay type, in which event the retraction of the cam follower of the switch 21 is accomplished a short while after its reaching the extended position. When the detaining units 17 engage the respective bucket 2, the arms 15 are pivoted until the time-delay switch 23 is actuated, which switch 23 interrupts the communication between the phase and the actuating part of the switch $d_1$ after a predetermined period of time, whereby the connecting part $d_1$ of the switch 30 returns into its starting position, the reverse operation of the bucket wheel 1 being terminated by deenergization of a switch $c_1$, and the detaining units 17 being returned into their original positions by deenergization of the electromagnet $s_3$.

It will be understood that each of the elements described above, or two or more together, may also find a useful application in other types of constructions differing from the types described above.

While the invention has been illustrated and described as embodied in a bucket-type arrangement for conveying bulk materials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fully constitute essential characteristics of the generic or specific aspects of this invention.

What is claimed as new and desired to be protected by Letters Patent is set forth in the appended claims.

1. In an arrangement for transporting bulk materials, a combination comprising a support; transporting means mounted on said support for rotation in opposite circumferential directions about a central axis and including a bucket wheel, a plurality of buckets each having two inlet openings, and means for mounting each of said buckets on said bucket wheel for pivoting relative thereto about a pivot axis substantially parallel to said central axis between two end positions in each of which one of said openings faces in one of said circumferential directions, and for shared movement therewith in a circular path; means for rotating said transporting means in a transporting mode in which each of said buckets assumes a first end position with a respective opening thereof facing in the circumferential direction of movement of said buckets for entry of bulk material into said bucket through said respective opening, and in a reversing mode in which said buckets move in an opposite circumferential direction than during said transporting mode; and means for concurrently pivoting said buckets during said reversing mode from said first into a second end position of each of said buckets in which the other opening of the latter faces in said opposite circumferential direction, including detaining means arranged at a predetermined location along said path and operative for engaging a respective one of said buckets, means for actuating said detaining means into engagement with said respective bucket at said location to thereby discontinue the movement of said respective bucket in said path and pivot the same about said pivot axis during the continuing rotation of said bucket wheel in said opposite direction, and means for interconnecting said buckets for synchronized pivoting between said end positions thereof.

2. A combination as defined in claim 1, wherein said displacing means further includes means for detecting the position of said respective bucket in said path and operative for generating a signal when said respective bucket is at said location during said reversing mode; and wherein said actuating means is responsive to said signal.

3. A combination as defined in claim 2, wherein said detecting means includes a part-annular cam coaxially mounted on said transporting means for shared rotation therewith and extending over an angle corresponding to that through which said transporting means is to rotate during the actuation of said detaining means, a cam follower mounted on said support for displacement toward and away from the path of movement of said cam, means for displacing said cam follower between a retracted position in which said cam follower is spaced from said path of movement of said cam, an intermediate position in which said cam follower contacts said cam, and an extended position in which said cam follower extends into said path of movement of said cam beyond the limits of the latter, and means for generating said signal mounted on said cam follower for shared displacement therewith and generating said signal in said intermediate position of said cam follower.

4. A combination as defined in claim 1, wherein said detaining means includes a pair of detaining portions arranged at said location to axial sides of said path; and wherein said actuating means is operative for simultaneously displacing said detaining portions toward and away from said path and into and out of engagement with said respective bucket in a direction transverse to said path and substantially parallel to said central axis.

5. A combination as defined in claim 4, wherein said detaining means includes at least one arm having a first end pivotally mounted on said support, and a free second end at said location; and wherein said detaining portions are mounted on said second end of said arm for shared pivoting therewith.

6. A combination as defined in claim 5, wherein said detaining means includes two detaining units each having a cylinder and a piston element, one of said elements being rigidly mounted on said second end of said arm, and the other element being mounted on said one element for reciprocation relative thereto in substantial parallelism with said central axis; and wherein said detaining portion is connected to said other element for reciprocation therewith.

7. A combination as defined in claim 5, wherein said detaining means includes two detaining units each having an electromagnet and an armature element, one of said elements being rigidly mounted on said second end of said arm, and the other element being mounted on said one element for reciprocation relative thereto in substantial parallelism with said central axis; and wherein said detaining portion is connected to said other element for reciprocation therewith.

8. A combination as defined in claim 5, wherein said detaining means includes at least one electric motor rigidly mounted on said second end of said arm; and wherein said detaining portions are operatively connected to said electromotor for being displaced thereby in opposite directions substantially parallel to said central axis.

9. A combination as defined in claim 1, wherein said mounting means includes a pivot which mounts said respective bucket on said bucket wheel for said pivoting between said end positions about said pivot axis.

10. In an arrangement for transporting bulk materials, a combination comprising a support; transporting means mounted on said support for rotation in opposite circumferential directions about a central axis and including a bucket wheel, at least one bucket having an open end, and means for mounting said bucket on said bucket wheel for angular displacement relative thereto along a plane transverse to said central axis between two end positions in each of which said open end faces in one of said circumferential directions, and for shared movement therewith in a circular path; means for rotating said transporting means in a transporting mode in which the bulk material enters said bucket through said open end which faces in the circumferential direction of movement of said bucket; means for operating said transporting means in a reversing mode in which said bucket moves in an opposite circumferential direction than during said transporting mode; and means for angularly displacing said bucket during said reversing motor, including detaining means arranged at a predetermined location along said path and operative for engaging said bucket, means for detecting the position of said bucket in said path, including a part-annular cam coaxially mounted on said transporting means for shared rotation therewith and extending over an angle corresponding to that through which said transporting means is to rotate during the actuation of said detaining means, a cam follower mounted on said support for displacement toward and away from the path of movement of said cam, means for displacing said cam follower between a retracted position in which said cam follower is spaced from said path of movement of said cam, an intermediate position in which said cam follower contacts said cam, and an extended position in which said cam follower extends into said path of movement of said cam beyond the limits of the latter, and means for generating a signal when said bucket is at said location during said reversing mode, mounted on said cam follower for shared displacement therewith and generating said signal in said intermediate position of said cam follower; and means for actuating said detaining means into engagement with said bucket at said location in response to said signal to thereby discontinue the movement of said bucket in said path and angularly displace the same relative to said bucket wheel from one into the other end position during the continuing rotation of said bucket wheel in said opposite direction.

11. A combination as defined in claim 10, wherein said signal-generating means includes a switch which is open in said retracted and extended positions, and closed in said intermediate position and which controls said actuating means.

12. A combination as defined in claim 10, wherein said detecting means further includes an additional cam circumferentially and radially spaced from said cam and extending over a larger angle than the latter, an additional cam follower similar to said cam follower and additional signal-generating means operative for generating a control signal which releases said cam follower for displacement toward said extended position when said additional cam follower extends into the path of displacement of said additional cam beyond the limits of the latter.

13. A combination as defined in claim 12, wherein said additional cam is substantially diametrally opposite to said cam and said additional cam follower is diametrally opposite to said cam follower.

14. A combination as defined in claim 12, wherein said detecting means further includes additional means for displacing said additional cam follower between respective retracted, intermediate and extended positions thereof and operative for displacing said additional cam follower toward said retracted position thereof immediately upon reaching said extended position; and wherein said additonal signal-generating means includes an additional switch which is open in said intermediate and extended positions and closed in said retracted position and which controls the displacement of said cam follower.

15. A combination as defined in claim 10, wherein said transporting means further includes a plurality of additional buckets similar to said bucket and angularly distributed on said bucket wheel about said central axis.

16. A combination as defined in claim 15, and further comprising means for interconnecting said one bucket and said additional buckets for synchronized angular displacement between the respective two end positions thereof.

17. A combination as defined in claim 16, wherein said mounting means further includes a lever having one end attached to said bucket, another end spaced from said one end, and a mounting portion intermediate said ends and mounted on said pivot; and wherein said interconnecting means connects said other ends of said levers of said mounting means of said one and additional buckets with one another.

18. A combination as defined in claim 17, wherein said interconnecting means includes a plurality of elongated connecting elements which are connected to each adjacent two of said levers and which compensate for differential displacement of said levers relative to one another during said angular displacement.

19. A combination as defined in claim 18, wherein said connecting elements are ropes.

20. A combination as defined in claim 17; and further comprising means for arresting said bucket in at least one position thereof, including brake means engaging said lever at least in said end positions of said bucket to prevent undesirable angular displacement thereof.

* * * * *